US005627374A

United States Patent [19]
Couderc et al.

[11] Patent Number: 5,627,374
[45] Date of Patent: May 6, 1997

[54] STATIC INFRARED PANORAMIC WATCHING DEVICE WITH MULTIPLE MATRIX DETECTORS

[75] Inventors: Georges Couderc, Bures sur Yvette; François Micheron, Gif-sur-Yvette, both of France

[73] Assignee: Thomson-CSF, Paris, France

[21] Appl. No.: 544,441

[22] Filed: Nov. 17, 1995

[30] Foreign Application Priority Data

Nov. 18, 1994 [FR] France .................................. 94 13841

[51] Int. Cl.$^6$ .................................................. G02B 26/10
[52] U.S. Cl. ....................................... 250/334; 250/332
[58] Field of Search ............................. 250/334, 332, 250/330, 339.14

[56] References Cited

U.S. PATENT DOCUMENTS

| | | |
|---|---|---|
| 3,479,510 | 11/1969 | Baumberger et al. . |
| 3,782,802 | 1/1974 | Micheron et al. . |
| 3,847,465 | 11/1974 | Micheron et al. . |
| 3,892,465 | 7/1975 | Micheron et al. . |
| 3,940,201 | 2/1976 | Micheron et al. . |
| 3,961,837 | 6/1976 | Bied-Charreton et al. . |
| 3,978,458 | 8/1976 | Vergnolle et al. . |
| 4,024,513 | 5/1977 | Huignard et al. . |
| 4,028,544 | 6/1977 | Jourdan et al. . |
| 4,055,838 | 10/1977 | Huignard et al. . |
| 4,063,795 | 12/1977 | Huignard et al. . |
| 4,065,671 | 12/1977 | Mayeux et al. . |
| 4,065,677 | 12/1977 | Micheron et al. . |
| 4,072,861 | 2/1978 | Couderc et al. . |
| 4,092,494 | 5/1978 | Micheron . |
| 4,124,268 | 11/1978 | Micheron et al. . |
| 4,138,189 | 2/1979 | Huignard et al. . |
| 4,163,162 | 7/1979 | Micheron . |
| 4,175,285 | 11/1979 | Dansac et al. . |
| 4,176,345 | 11/1979 | Micheron et al. . |
| 4,205,242 | 5/1980 | Micheron et al. . |
| 4,227,082 | 10/1980 | Mayeux et al. . |
| 4,244,030 | 1/1981 | Albarello . |
| 4,284,921 | 8/1981 | Lemonon et al. . |
| 4,286,760 | 9/1981 | Couderc et al. . |
| 4,287,412 | 9/1981 | Couderc et al. . |
| 4,327,153 | 4/1982 | Micheron . |
| 4,345,359 | 8/1982 | Micheron . |
| 4,346,505 | 8/1982 | Lemonon et al. . |
| 4,354,134 | 10/1982 | Micheron . |
| 4,368,386 | 1/1983 | Huignard et al. . |
| 4,369,391 | 1/1983 | Micheron . |
| 4,384,394 | 5/1983 | Lemonon et al. . |
| 4,400,634 | 8/1983 | Micheron . |

(List continued on next page.)

FOREIGN PATENT DOCUMENTS

| | | |
|---|---|---|
| 0475670 | 3/1992 | European Pat. Off. . |
| 0511899 | 11/1992 | European Pat. Off. . |
| 1482753 | 8/1977 | United Kingdom . |
| 2143397 | 2/1985 | United Kingdom . |
| WO93/09463 | 5/1993 | WIPO . |

*Primary Examiner*—David P. Porta
*Assistant Examiner*—Richard Hanig
*Attorney, Agent, or Firm*—Oblon, Spivak, McClelland, Maier & Neustadt, P.C.

[57] ABSTRACT

It is sought to obtain efficient detection and tracking capacity by a particular form of organization including a microscanning device common to all the detectors. In one embodiment, the disclosed device includes of a frame with a shape generated by revolution around an elevation axis. This frame bears afocal optical sets coupled respectively to optical focusing sets to project the light fluxes coming from the scenes observed and to form images on fixed detectors. Prisms, with a predetermined angle at the vertex and a predetermined orientation, are distributed in a circle on a rotational drum with an axis that is identical with the elevation axis so that, during the rotation of the drum, each prism intercepts the observation flux in the form of parallel beams and deflects it so as to prompt a virtual shift of the sensors of each detector corresponding to a micro-scanning step. Such an operation may find particular application to panoramic imaging, in particular to simultaneous observation by several operators.

10 Claims, 4 Drawing Sheets

U.S. PATENT DOCUMENTS

| | | |
|---|---|---|
| 4,401,911 | 8/1983 | Ravinet et al. . |
| 4,403,382 | 9/1983 | Facoetti et al. . |
| 4,419,598 | 12/1983 | Spitz et al. . |
| 4,419,599 | 12/1983 | Micheron . |
| 4,427,609 | 1/1984 | Broussoux et al. . |
| 4,440,388 | 4/1984 | Divoux et al. . |
| 4,500,377 | 2/1985 | Broussoux et al. . |
| 4,508,668 | 4/1985 | Broussoux et al. . |
| 4,518,555 | 5/1985 | Ravinet et al. . |
| 4,521,322 | 6/1985 | Broussoux et al. . |
| 4,535,205 | 8/1985 | Ravinet et al. . |
| 4,607,145 | 8/1986 | Ravinet et al. . |
| 4,649,312 | 3/1987 | Robin et al. . |
| 4,670,074 | 6/1987 | Broussoux et al. . |
| 4,708,989 | 11/1987 | Broussoux et al. . |
| 4,734,228 | 3/1988 | Micheron et al. . |
| 4,782,227 | 11/1988 | Micheron et al. . |
| 4,808,823 | 2/1989 | Moore et al. ................... 250/334 |
| 4,812,647 | 3/1989 | Broussoux et al. . |
| 4,818,857 | 4/1989 | Micheron et al. . |
| 4,818,877 | 4/1989 | Ayrai et al. . |
| 4,873,455 | 10/1989 | de Chambost et al. . |
| 5,102,065 | 4/1992 | Couderc et al. . |
| 5,214,716 | 5/1993 | Refregier et al. . |
| 5,282,073 | 1/1994 | Defour et al. . |

STATIC INFRARED PANORAMIC WATCHING DEVICE WITH MULTIPLE MATRIX DETECTORS

BACKGROUND OF THE INVENTION

1. Field of the Invention

The invention relates to the field of panoramic watching or monitoring and more particularly to infrared panoramic watching in the atmospheric transmission spectral bands, namely the 3 to 5 µm or 8 to 12 µm bands.

Panoramic watching is designed to enable observation in a 360° field in order to detect and follow any object present in this field of observation. The invention can be applied especially to target detection, multiple-missile guidance, infrared imaging and the detection of pollutant gases.

Panoramic watching should make it possible, for a given range, to obtain efficient and precise detection and tracking. Now, existing methods of panoramic watching cannot be used to obtain a refresh rate, a degree of sensitivity and a degree of image resolution sufficient to provide high-quality detection and tracking.

2. Description of the Prior Art

There are, in particular, panoramic watching systems with one or two rotating detectors that may or may not be associated with a mirror in order to cover space over a range of 360°. The detectors used have a large number of elementary sensors positioned on a small number of rows. The detectors are then in the form of strips or are arranged in matrix form. The term used then is that of matrix detectors. Watching systems such as these, described for example in the patent FR-9009967 (57638), have a low rate of analysis of space, in the range of some Hertz. This gives a detection image refresh rate that is not enough to carry out efficient target tracking. Furthermore, when such detectors are used to cover 360° in relative bearing, the integration time of each elementary sensor is in the range of some tens of microseconds. This makes the watching device insensitive and brings about a concomitant increase in the rate of false alarms.

Furthermore, in order to increase the resolution of detection and hence its precision, there is a known way of carrying out a micro-scanning operation of the detector in such a way as to artificially increase the number of elementary sensors of this detector. A micro-scanning operation such as this is usually obtained by the insertion, into the optical system associated with the detector, of one or more rotating or vibrating plates or prisms (with two associated prisms forming a diasporameter) at a frequency that matches the refresh rate of the detection image. Now such plates, described for example in the patent EP-282 182, do not stand up to operating frequencies compatible with a rate of analysis of more than some Hertz.

SUMMARY OF THE INVENTION

The invention is aimed at overcoming the drawbacks of the prior art and notably of obtaining efficient and precise detection and tracking capacity especially by means of a micro-scanning device driven by a rotational motion and having adapted angle and orientation prisms positioned in a circle around fixed matrix detectors also positioned in a circle. The micro-scanning device is common to all the matrix detectors and each detector undergoes the same micro-scanning operation performed by the successive passage of the prisms. The micro-scanning may be split up, for each detector, into a number of successive steps corresponding to the positions virtually occupied by the elementary sensors of a detector and equal to the number of prisms having different characteristics (namely characteristics pertaining to orientation and angle at the vertex) passing before this detector.

More specifically, an object of the invention is a static infrared panoramic watching device with multiple matrix detectors formed by elementary sensors comprising an optical system associated with each detector for the projection, on this detector, of an observation light flux coming from a portion of space demarcated by a visual field with an aperture defined as a function of the number of detectors, wherein the detectors are fixed and distributed in a circle about an elevation axis and wherein the prisms are distributed in a circle on a rotational drum with a rotational axis that is identical with the elevation axis so that, during the rotation of this drum, each prism successively intercepts, as a parallel beam, the light flux going through the optical system of each detector, the prisms having an angle at the vertex with a specified value and orientation so as to then bring about an elementary deflection of the light fluxes of observation corresponding to a virtual elementary shift of each sensor and defining a micro-scanning pitch.

The invention has the advantage of enabling the implementation of a single micro-scanning device common to all the detectors with a simple structure as compared with the multiple application obtained, namely the simultaneous implementation of a large number of micro-scanning operations, for example twelve of them. It is then possible, under the conditions referred to, to obtain compatible micro-scanning operations, high rates of spatial analysis in the range of 20 to 50 Hz and an optimized level of sensitivity with an integration time of the charges of each elementary sensor equal to about one millisecond. Furthermore, the micro-scanning achieved enables the obtaining, for each detector, of a resolution in the range of that obtained by the eye, namely about 0.3 mrad.

Indeed, the angles of the prisms used to obtain the micro-scanning are very small, in the range of some tens of milliradians. Under these conditions, the useful rays coming from the field of observation are deflected in the same way by the crossing of one and the same prism whatever may be their angle of incidence located in a field aperture having a value that may be as high as, for example +/−20°. Similarly, the rotation of the prism during the period of integration of the charges of the corresponding detector has practically no effect on the value of the deflection. It follows therefrom that each pixel formed does not "slide" during the period of integration of the charges as is the case with known micro-scanning devices. Furthermore, the assembly of the prisms may be implemented with high tolerance.

According to an advantageous characteristic, one or two additional prism locations may be occupied by one or two black bodies whose temperature, which is close to the ambient temperature, is held at a fixed value. The intensity of the signals obtained makes it possible to carry out an adjustment in terms of level with a black body and furthermore in terms of gain with two black bodies for all the elementary sensors of one and the same detection matrix. This same adjustment can be obtained by means of frosted plates or any means enabling a defocusing to illuminate the entire detector.

Another advantageous characteristic is that of having one or two filters available for the detection of atmospheric pollutant gases in the location of one or two micro-scanning prisms. Such filters are described in the European patent EP 544 962 and enable the detection of the presence of the gas by differential measurement.

According to a preferred embodiment of the invention, with each location of a prism of the rotating drum constituting a zone occupied either by a micro-scanning prism or by a black body or a filter, the number of zones is equal to the number of matrix detectors. Under these conditions, the electronic control circuitry is simplified since only one micro-scanning pitch synchronization device may be used.

According to a first exemplary embodiment, the matrix detectors and the micro-scanning prisms are located in planes substantially parallel to the elevation axis and each optical system may include a front afocal optical set to obtain better adaptation to operational conditions.

According to another exemplary embodiment, the matrix detectors and the locations of micro-scanning prisms are positioned in mutually parallel planes perpendicular to the elevation axis. An onward reflecting mirror then reflects the useful flux coming from the field of observation to a matrix detector. Each deflector flux is intersected by the rotational drum.

BRIEF DESCRIPTION OF THE DRAWINGS

Other features and advantages shall appear from the reading of the following detailed description, accompanied by the appended figures, of which respectively.

MORE DETAILED DESCRIPTION

Figure 1:
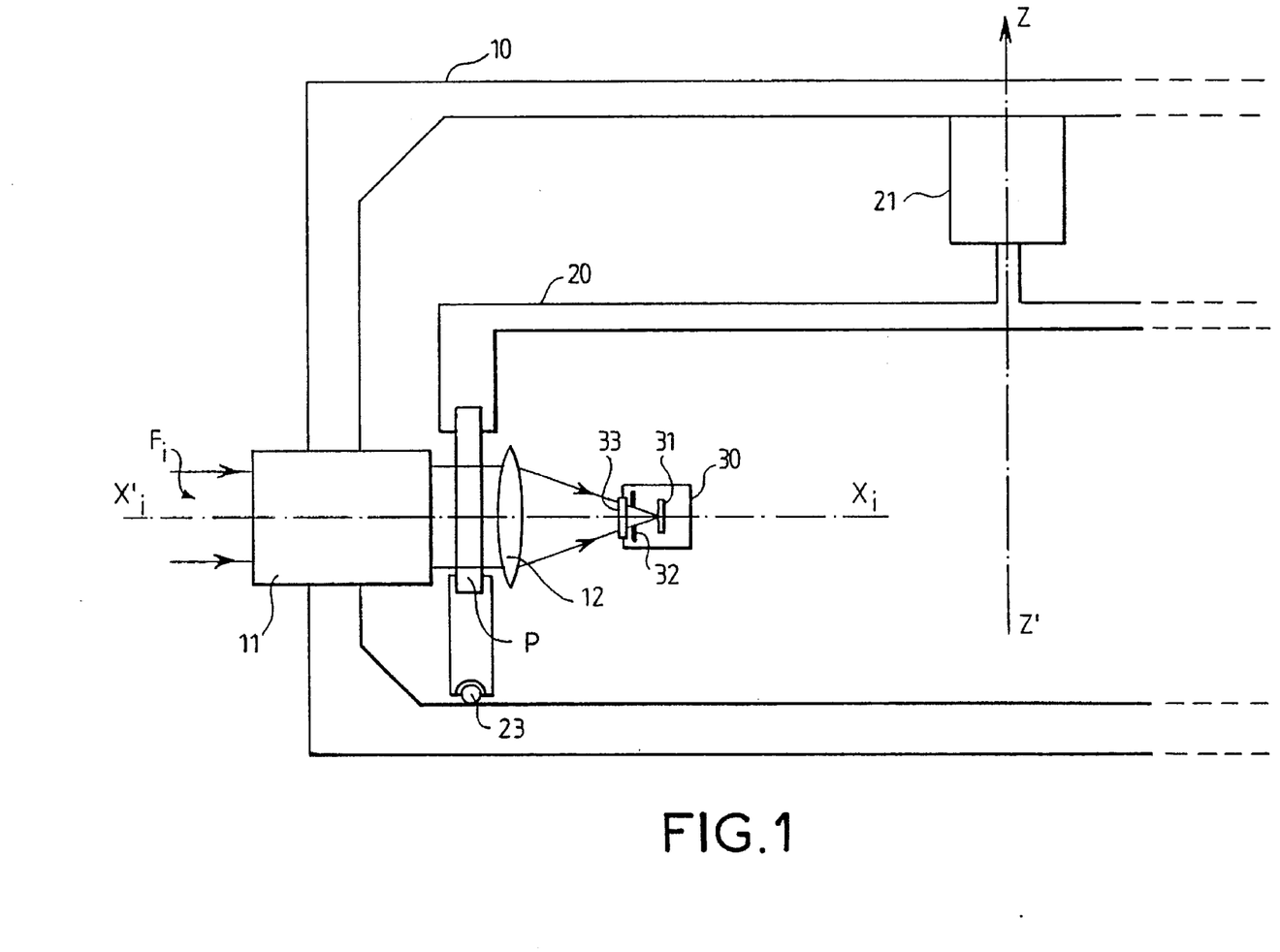
FIG. 1 shows a sectional view along the elevation axis of a schematic exemplary embodiment of a panoramic watching device according to the invention.

FIG. 1 gives a sectional view, along a plane containing the elevation axis Z'Z, of a schematic exemplary embodiment of an infrared panoramic watching device according to the invention. In this figure, a structure 10 has an axis of revolution that is the same as the elevation axis Z'Z and carries afocal optical sets 11 evenly distributed in a circle about the elevation axis. Within the structure 10, there is a drum 20 that is rotationally driven by means of a motor 21 about its axis of revolution merged with the elevation axis Z'Z. The drum 20 bears prisms P in locations distributed in a circle and evenly about the elevation axis on the part of the drum that is revolving about this elevation axis. In the exemplary embodiment shown, the drum 20 has a cylindrical face generated by revolution about the elevation axis Z'Z and the prisms P are mounted in this face so that they are substantially parallel to the elevation axis.

Each afocal optical set 11 is coupled with an optical focusing set 12 so that the light flux $F_i$ coming from the scene observed in a field of observation defined about an axis $X'_iX_i$ is projected on a matrix detector 31. Each matrix detector is positioned in a cryostat 30 that has a cold screen 32 limiting the light flux that reaches the detector 31 to the useful flux cooled by means of a cold finger coupled with any known cooling device. The cooling device may advantageously be a single compressor for all the cryostats. The fixed detectors may then be fitted out with a Joule Thomson expansion probe connected to the compressor.

Figure 2:
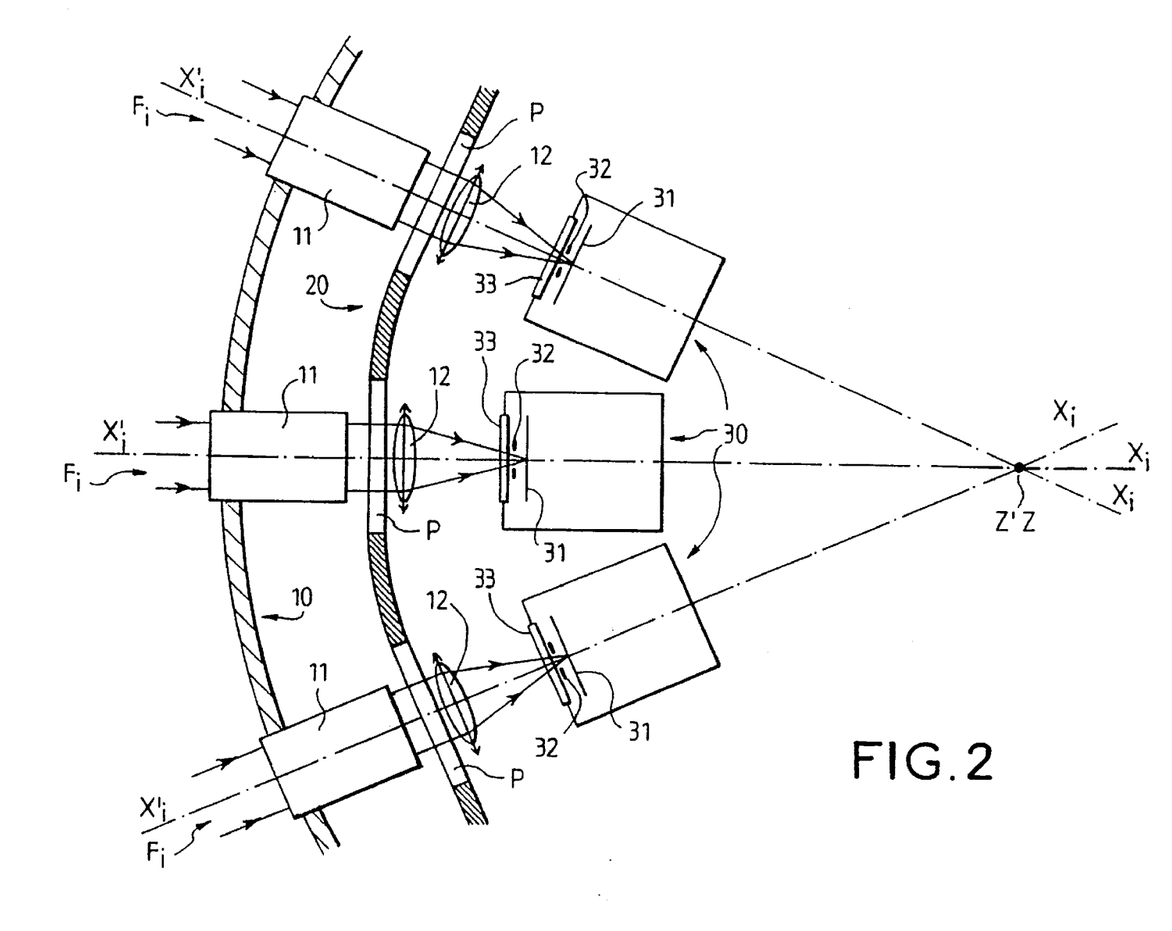
FIG. 2 shows the same schematic exemplary embodiment seen in a sectional view along a plane perpendicular to the elevation axis.

The part of the drum 20 that bears the prisms P is supported on the base of the structure 10 by bearings 23. During the rotation of the drum 20, the prisms P successively intercept the light fluxes $F_i$ as a parallel beam between the afocal set 11 and the focusing set 12. A view of this very same embodiment, in a partial sectional view along the axes $XX'_i$, is shown in FIG. 2. In this figure, since the elements of FIG. 1 are shown with the same reference signs, it can be seen that the optical axes $X'_iX_i$ radiate perpendicularly to the axis Z'Z as well as to all the elements positioned along these axes $X'_iX_i$, namely the afocal sets 11, the focusing sets 12 and the cryostats 30. FIGS. 1 and 2 show the prisms P when they intercept the beams $F_i$, namely when they pass into the optical system formed by the afocal set 11 and the focusing set 12 associated with each matrix detector 31.

The matrix detectors are formed by a large number of elementary sensors, for example 128×128 sensors or 256×256 sensors or more, arranged in matrix form in a substrate. The sensors are formed conventionally by photosensitive materials in the infrared band used, for example indium antimony (InSb) for the 3 to 5 μm band or a composite material of mercury-cadmium-tellurium (Hg—Cd—Te) for the 3 to 5 μm or 8 to 12 μm band. The elementary sensors conventionally have a substantially square shape, for example with a side equal to 15 or 20 μm and may be at a distance from one another that could go up to three to five times their size.

This distance makes it easier to resolve the technological constraints and enables the insertion of high-capacitance potential wells. The electronic processing of the charges integrated proportionally to the fluxes received indeed calls for the presence of storage capacities and integrated linking conductors. Thus, a matrix detector takes a substantially square shape or rectangular shape with a side equal to 10 to 20 mm or more.

In order to improve the resolution of the detection obtained by means of such detectors, the prisms P have an angle at the vertex with a value and orientation such that a micro-scanning operation by each elementary sensor achieves a virtual shift of this sensor from one intermediate position to another until there is a return to its initial position, when the prisms successively pass before the detector, each prism corresponding to a micro-scanning position.

Figure 3:
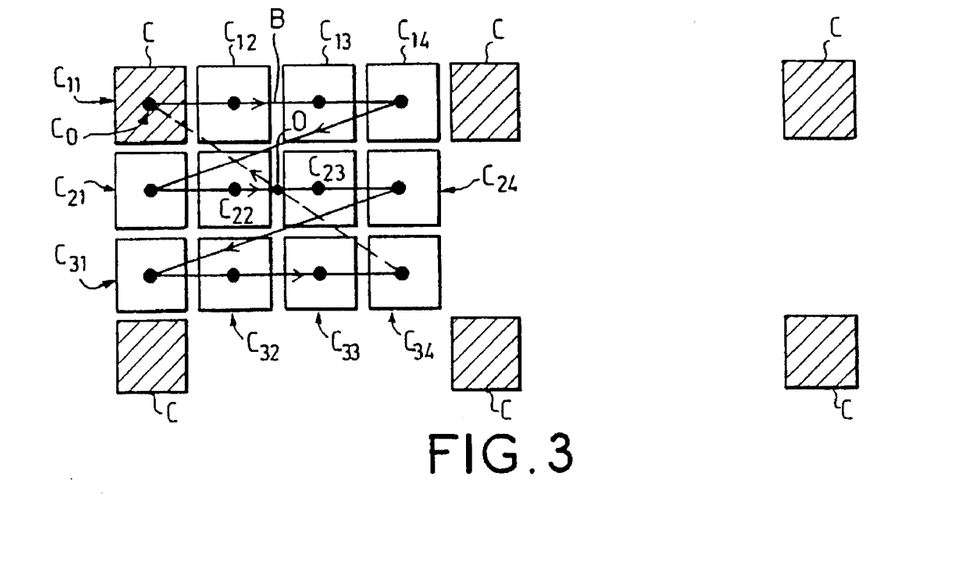
FIG. 3 shows an exemplary view of the micro-scanning of a matrix detector obtained by means of the micro-scanning prisms of a watching device according to the invention.

More specifically, FIG. 3 illustrates the successive virtual positions of a sensor of a matrix detector for a 12-position zigzag micro-scanning operation obtained by means of a 12-prism rotational drum. The figure shows only a limited number of sensors C of a matrix detector. One of these elementary sensors has been shown in twelve successive positions, $C_{11}$ to $C_{34}$, obtained by the passage of each of the twelve prisms positioned in the drum according to the above description. The scanning B shown corresponds to a line that connects the successive positions of the center $C_0$ of the sensor C obtained by the corresponding deflection of the elementary beam coming from the elementary field of view of the sensor during the successive passages of the prisms P.

The deflection may be computed so that each position of the micro-scanning partially overlaps the adjacent positions in order to obtain detection of greater reliability. In the example shown, the successive positions do not overlap one another, but this is only in order to simplify the figure. Even if it should be the case that the micro-scanning positions are not contiguous, they make it possible, if all the elementary sensors C undergoing such a micro-scanning operation are considered, to multiply the number of sensors of the matrix by 12. It being known that a detector with n elementary sensors has a resolution proportional to XX, the resolution of this matrix is then multiplied by a factor greater than 3.

The prisms used are cut out of materials transparent in the infrared band used, for example, ZnSe (zinc selenide) for the 8 to 12 µm band. The basic material has a regular prismatic shape with a triangular cross-section having a ridge and two sides defining an angle at the vertex called the angle of the prism. The cutting is done along an axis substantially perpendicular to the mean plane of the basic prism. A cylindrical cut can be used, for example, to obtain round prisms P with a thickness that increases with distance from the edge portion located closest to the ridge of the basic prism.

Figure 4:
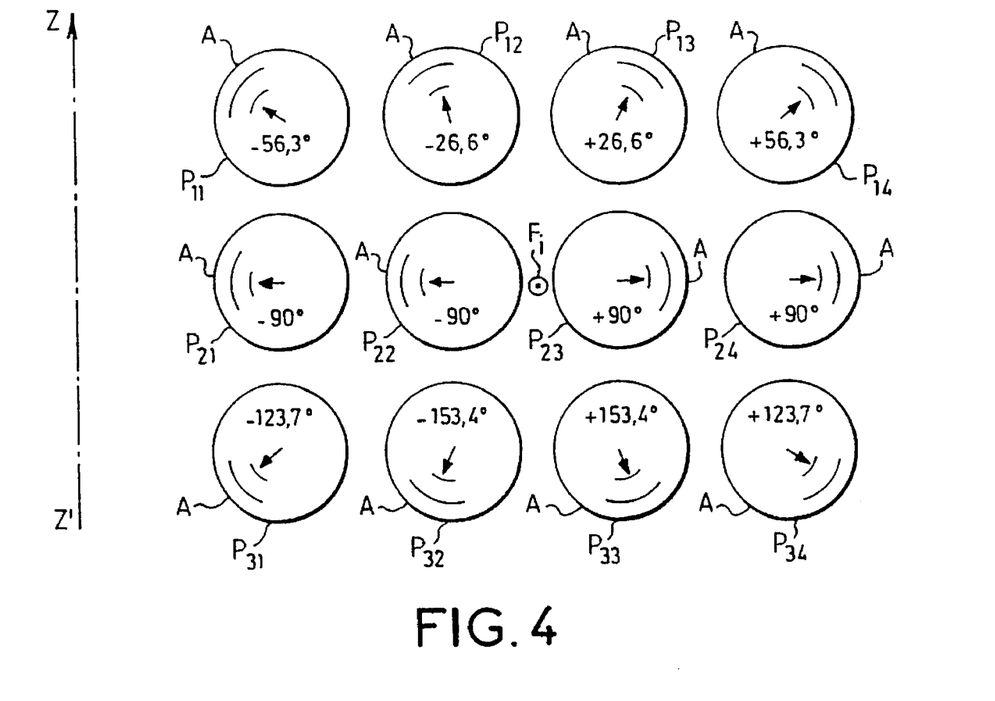
FIG. 4 shows the orientations of the different micro-scanning prisms for the implementation of a micro-scanning operation according to the previous figure.

The prisms $P_{11}$ to $P_{34}$ shown in FIG. 4 have a shape of this kind. These prisms can be used to carry out the scanning B shown in FIG. 3. They are oriented with respect to the elevation axis Z'Z along an arrow shown in the center of each of these prisms. This orientation is aimed at the position referenced A that corresponds to the thinnest edge portion of each of these prisms. To simplify the vocabulary, the term "angle at the vertex A" shall hereinafter designate the dihedron formed by the planes of the external faces of the prisms $P_{11}$ to $P_{34}$, i.e. ultimately the value of the angle at the vertex of the corresponding basic prism. The tangent at A to each of these prisms is parallel to the ridge of the basic prism and the orientation arrow indicates the position of this ridge. The prisms are mounted on the rotational drum 20 (FIGS. 1 and 2) along this orientation. However, in FIG. 4, these prisms are shown in a matrix arrangement so that their relative positions correspond to the relative positions C11 to C34 occupied successively by an elementary sensor C during the micro-scanning as explained with reference to FIG. 3.

The value of the angle of orientation of the prisms $P_{11}$ to $P_{34}$ indicated in FIG. 4, which gives the position of the angle at the vertex A, is measured algebraically with respect to the elevation axis Z'Z in assuming that the face shown of the prisms is the incident face of the fluxes $F_i$ coming from the fields of observation. The prisms are assembled in matrix form in FIG. 4 solely for convenience of explanation but they are distributed in the order P11 to P34 corresponding to the order of the scanning B in the locations of the drum 20 as described here above.

The orientation angle values indicated in FIG. 4 are then deduced directly from the positions of the centers of the sensors $C_{11}$ to $C_{34}$ identified angularly with respect to the geometrical center O of the scanning B by means of basic trigonometrical formulae.

It is possible to compute the angle at the vertex A of each prism. In order that the micro-scanning pitch, namely the distance between two positions adjacent to the center of the elementary sensor, may have a given value, for example equal to 15 µm, this value and this focal distance of the focusing group condition the value of the angle of resolution, for example being equal to 0.3 mrad for a 15 µm micro-scanning pitch and a focal distance of 50 mm. The angle of each of the prisms P11 to P34 at the vertex A can be deduced from the mean angle of deflection needed to obtain the desired positioning of the sensors, measured by the distance between the successive positions of the center $C_O$ indicated in the scanning B and the geometrical center O of micro-scanning. Indeed, with the angle of deflection D to be obtained being known, the angle at A is deduced from D by the following formula, obtained from the basic optical relationships of the prism and the index of refraction n and for a light ray having an angle of incidence i:

$$D = i + A\sin\left(n \times \sin\left(A - A\sin\left(\frac{\sin i}{n}\right)\right)\right) - A \quad [1]$$

It is known that, for small values of the angle at the vertex of a prism, the deflection of this prism is almost independent of the angle of incidence. This fundamental property of the prisms is thus fully made use of in the context of the invention. Computation shows more precisely that the angle of deflection D of a light ray varies very slightly (by some %) for angles of incidence i of this ray varying by +/−20°, which is expressed by a negligible sliding of the image on the detector (of the order of one micrometer for very low values of angles at the vertex A, such as those used hereinafter). Furthermore, this property is preserved despite the rotation of the prisms throughout the period of integration of the charges.

The exemplary numerical values that follow are given by using ZnSe as a material for the prisms having a refraction index n equal to 2.4 and for an average angle of incidence i equal to 5°. The prisms may be classified under four categories having the same angular value at the vertex for they bring about one and the same value of positioning in relation to the sensor C with respect to the center O of scanning, namely the prisms $P_{22}$ and $P_{23}$; $P_{21}$ and $P_{24}$; $P_{12}$, $P_{13}$, $P_{32}$ and $P_{33}$; $P_{11}$, $P_{14}$, $P_{31}$ and $P_{34}$. The following table summarizes the numerical values, for the prisms $P_{11}$ to $P_{34}$ arranged according to these categories, of the angle of deflection D necessary to obtain the positioning T of the corresponding center $C_O$ (this positioning is measured directly by the distance to the center O of scanning as stated further above) and of the angle of the prism A deduced from the relationship [1] above:

| Prism category | $P_{22}$ and $P_{23}$ | $P_{21}$ and $P_{24}$ | $P_{12}$, $P_{13}$, $P_{32}$ and $P_{33}$ | $P_{11}$, $P_{14}$, $P_{31}$ and $P_{34}$ |
| --- | --- | --- | --- | --- |
| T (µm) | 7.5 | 22.5 | 16.8 | 27 |
| D (mrd) | 0.15 | 0.45 | 0.335 | 0.54 |
| A (mrd) | 0.11 | 0.32 | 0.24 | 0.38 |

If it is sought, in this numerical application, to use standard focusing sets (referenced 12 in FIG. 1) with a focal distance equal to 50 mm for the projection, on the detectors, of a field of observation with an aperture equal to +/−15°, it would then be appropriate to use detectors with dimensions equal to about 25×25 mm², these values being deduced from the fundamental optical relationship defining the focal distance of a lens. By using fourteen positions of prisms on the drum 20 and by keeping two of these positions for functions that shall be described further below, the aperture of the field of each detector is then taken as being equal to +/−13° in order to obtain slight overlapping for a 360° aperture. Thus, for focusing sets with focal distances equal to 50 mm, the size of the detectors is then 23×23 mm².

It must be noted that the drum 20 relating only to passive optical elements does not require any electrical rotating joint. This drum may rotate at speeds of 1200 rpm or 3000 rpm, which corresponds to watching rates equal to 20 Hz or 50 Hz for one full micro-scanning operation per drum rotation. These rates are quite compatible with periods of integration of charges in sensors in the range of one millisecond. This makes it possible to optimize the use of detector matrixes with multiple storage wells in considering their quantum yield (of the order of 60%).

According to this preferred embodiment, the number of locations cut out in the rotating drum, hereinafter also called zones, is equal to the number of matrix detectors. This characteristic makes it possible to simplify the electronic processing operation by providing for only one synchronization circuit to simultaneously control all the operations for reading the detectors and the operation for processing the charges to give an output signal adapted to the standard of the display device.

It is useful to reserve one or two zones, which implies the use of one or two additional matrix detectors, if it is sought to preserve the advantages mentioned here above in order to carry out additional measurements.

The first measurement consists of an adjustment of level and possibly of gain for all the sensors of one and the same matrix detector. For it is known that, during an infrared detection operation, the modulation coming from the useful signal may be very low with respect to the ambient background, the maximum emissivity being located at the ambient temperature in the infrared spectral band (approximately on a line located at 10 μm). It is therefore important to reduce the effects due to the non-homogeneity of the infrared sensors with respect to one another.

To achieve this compensation, there is a known way of using one and the same black body reference stabilized at a temperature close to ambient temperature. To improve the correction, it is possible to use two black bodies at two temperatures that are different but remain close to the ambient temperature in order to also obtain compensation in gain for the different elementary sensors.

In a standard watching device, it is not easy to use black body references. However if, as in the present case, there is a rotating drum available to bear micro-scanning prisms, it is possible to use one or more additional zones on this drum. These additional zones will be formed by plates with emissivity close to one in the spectral band considered and temperature close to ambient temperature. The number of matrix detectors has to be increased by the number of additional zones if it is sought to preserve the advantages referred to further above.

For example, in the case of a 12-step micro-scanning operation, the use of a black body reference makes the number of detectors go to thirteen if it is desired that each detector should see the reference once per rotation, namely once per full analysis of the image. It is then possible to take the average of the reference information elements by achieving a charge integration once every rotation. This makes it possible to obtain compensation in a very short period of time. It is also possible to use one of the additional scattering elements or a frosted defocusing plate as a reference.

Another measurement consists of the detection of the presence of a pollutant gas. There is a known way, for example described in the patent EP 544 262, of detecting such gases by the successive use of two filters having one and the same transmission band, for example an infrared band, including an absorption line characteristic of the gas sought for one of the two filters. The detection of the gas is then deduced from the value of the ratio of the fluxes detected through either filter.

The watching device according to the invention enables the implementation of this type of detection under optimized conditions. For, it is enough to add an additional zone to the micro-scanning drum and use a prism with an angle and orientation corresponding to the chosen micro-scanning position to carry out the detection of pollutants. The prism is then covered with an optical filter for the rejection of the absorption band of the pollutant. By making a direct comparison of the detection obtained by means of the prism covered with the special detection filter and the prism corresponding to the same micro-scanning position, it is possible to deduce the presence of a pollutant gas therefrom.

Other particular filters may be used on the prisms in order to obtain improved spectral discrimination of targets with respect to the ambient background. This enables a further reduction of the false alarm rate.

A computation by a watching device according to the invention including the special measurements described is given hereafter. This example comprises twelve micro-scanning prisms, a black body reference and a pollutant detection filter positioned in fourteen zones distributed on a rotational micro-scanning drum. The watching device then has fourteen matrix detectors and, to cover an angle of 360° in relative bearing, each detector has an observation field of 26° in relative bearing. This makes it possible to obtain a slight overlapping between the detectors. If the dimensions of an elementary sensor are 20 μm×20 μm and if the desired micro-scanning pitch is 15 μm, to obtain an overlapping in order to improve the precision and the signal-to-noise ratio, an elementary computation shows that each matrix detector then has 576 elementary sensors along the elevation axis and 384 elementary sensors in relative bearing to meet these specifications. Thus, if it is desired to carry out the desired micro-scanning operation with four steps in relative bearing and three steps in elevation, the dimensions of the detector are about 26 mm in elevation and 23 mm in relative bearing. A 26° aperture of the field in relative bearing as announced then corresponds to an angle of aperture of the field in elevation of about 30°. Such a matrix may be obtained by the junction of different known detection matrices comprising an appropriate number of sensors. For a rate of analysis of 40 Hz, corresponding to efficient target tracking and with micro-scanning quantum yield assumed to be equal to 60%, the integration time possible for each micro-scanning position is in the range of one millisecond, giving the desired sensitivity.

With regard to the resolution of the image, the computations have been made so as to obtain a resolution of the order of 0.3 mrad. However, the precision may be further improved by implementing an operation for the overlapping of the micro-scanning steps in order to obtain a measurement that can be weighted.

Figure 5:
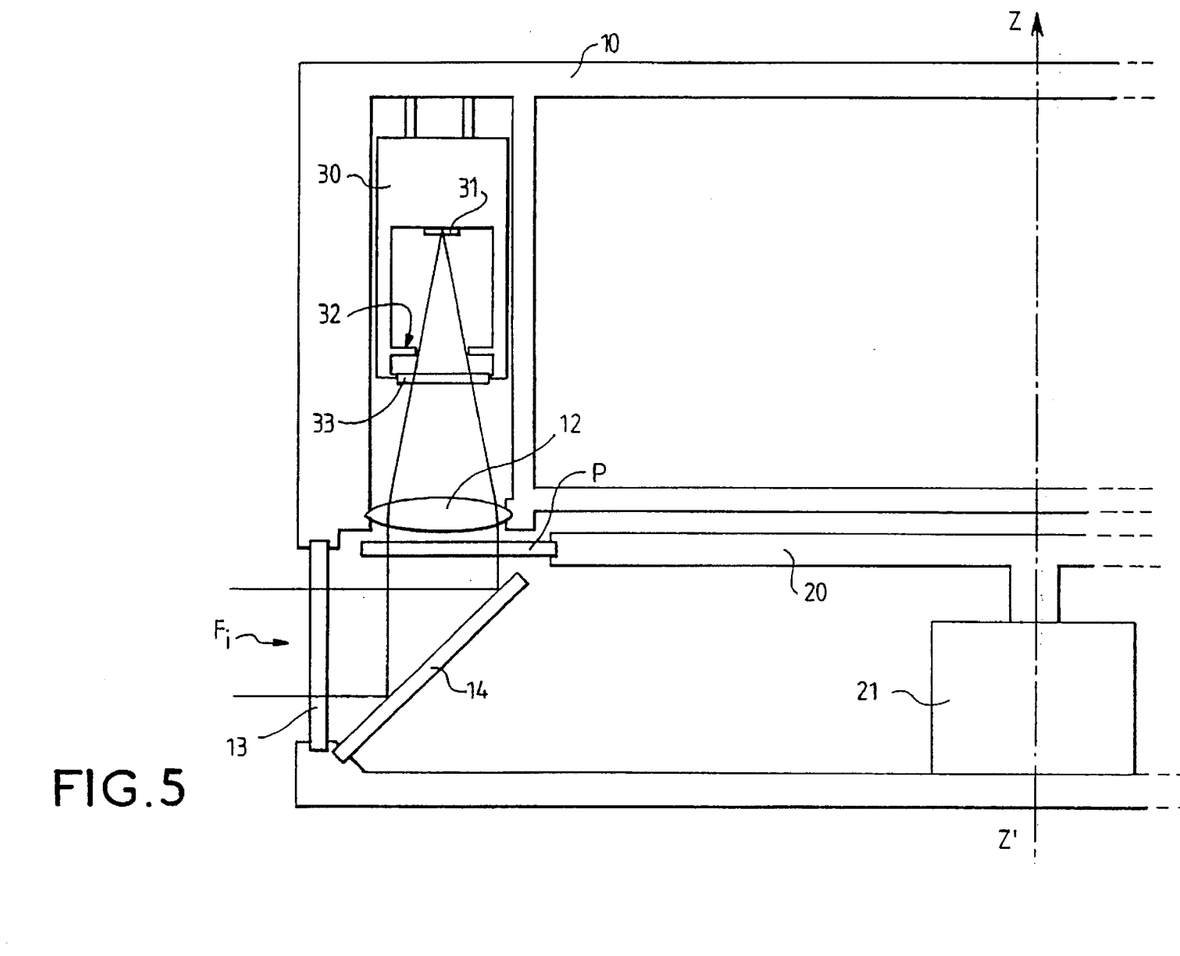
FIG. 5 shows a sectional view along a plane containing the elevation axis of another exemplary embodiment of a panoramic watching device according to the invention.

The invention is not limited to the examples described or shown. In particular, other arrangements are possible for the elements described here above. Thus, FIG. 5 shows another possible organization along a section plane containing an elevation axis Z'Z. In this Figure, it can be seen that the drum 20 has the different prisms perpendicularly to the elevation axis. Thus, the incident beam protects the device and gets reflected on an inclined mirror 14 and gets thrown on to the detector 31 positioned perpendicularly to the elevation axis Z'Z. The optical axis of the focusing set 12 and the geometrical axis of the cryostat 30 are parallel to the elevation axis. The incident beam $F_i$ first of all crosses a port 13 positioned in the structure 10 and it is then reflected by the mirror 14. According to another possibility, the face, generated by revolution, of the drum 20 may be inserted into the exterior of the optical systems of the detector. Protective caps are then placed in the structure 10.

Furthermore, the images of such a watching device may be transmitted to a helmet display unit with a servo-controlled viewing direction. The operator can then directly view the portion of space in the direction of observation. This makes it possible to eliminate the presence of a heat camera servo-linked with the movement of the helmet. It is also possible to distribute the operation of a watching device according to the invention in the directions of observation of the observers among several operators observing different directions. This makes it possible to do away with the need to use several thermal cameras servo-linked to the motion of each operator's helmet.

What is claimed is:

1. A static infrared panoramic watching device with a multiple number of matrix detectors formed by elementary sensors comprising an optical system associated with each detector for the projection, on each detector, of an observation light flux coming from a portion of space demarcated by a visual field with an aperture defined as a function of the number of detectors, wherein the detectors are fixed and distributed in a circle about an elevation axis and wherein prisms are distributed in a circle on a rotational drum with a rotational axis that is identical with the elevation axis so that, during rotation of this drum, each prism successively intercepts, as a parallel beam, the light flux going through the optical system of each detector, each prism having an angle at a vertex with a specified value and orientation so as to then bring about an elementary deflection of the light fluxes of observation corresponding to a virtual elementary shift of each sensor and defining a micro-scanning pitch.

2. An infrared panoramic watching device according to claim 1, wherein a number of zones defined for locations distributed in the rotational drum is equal to the number of matrix detectors.

3. A device according to claim 1, wherein at least one zone is reserved for a reference element for adjusting of a level or gain of the elementary sensors of each matrix detector.

4. A device according to claim 3, wherein the reference element is a black body or a frosted plate.

5. A device according to claim 1, wherein at least one zone is reserved for a filtering element for the detection of gas, bringing about a deflection of flux identical to that of at least one other prism.

6. A device according to claim 5, wherein the filtering element is a filter associated with a prism having an absorption line characteristic of a pollutant gas.

7. A device according to claim 1, wherein at least one zone is reserved for a filtering element whose passband is a subband of the infrared spectral band of sensitivity of the detectors.

8. A device according to claim 1, wherein the prisms intersect the light fluxes of observation within or outside the optical system of each detector, an external structure being then fitted out respectively with focal optical sets or ports positioned on a path of the observation fluxes.

9. A device according to claim 1, coupled to a helmet visual system fitted out with a display screen with a servo-linked direction of observation.

10. A device according to claim 1, coupled with as many helmet visual systems as the watching device has detectors, each helmet visual system being provided with a display screen with a servo-controlled viewing direction.

* * * * *